Patented Feb. 1, 1938

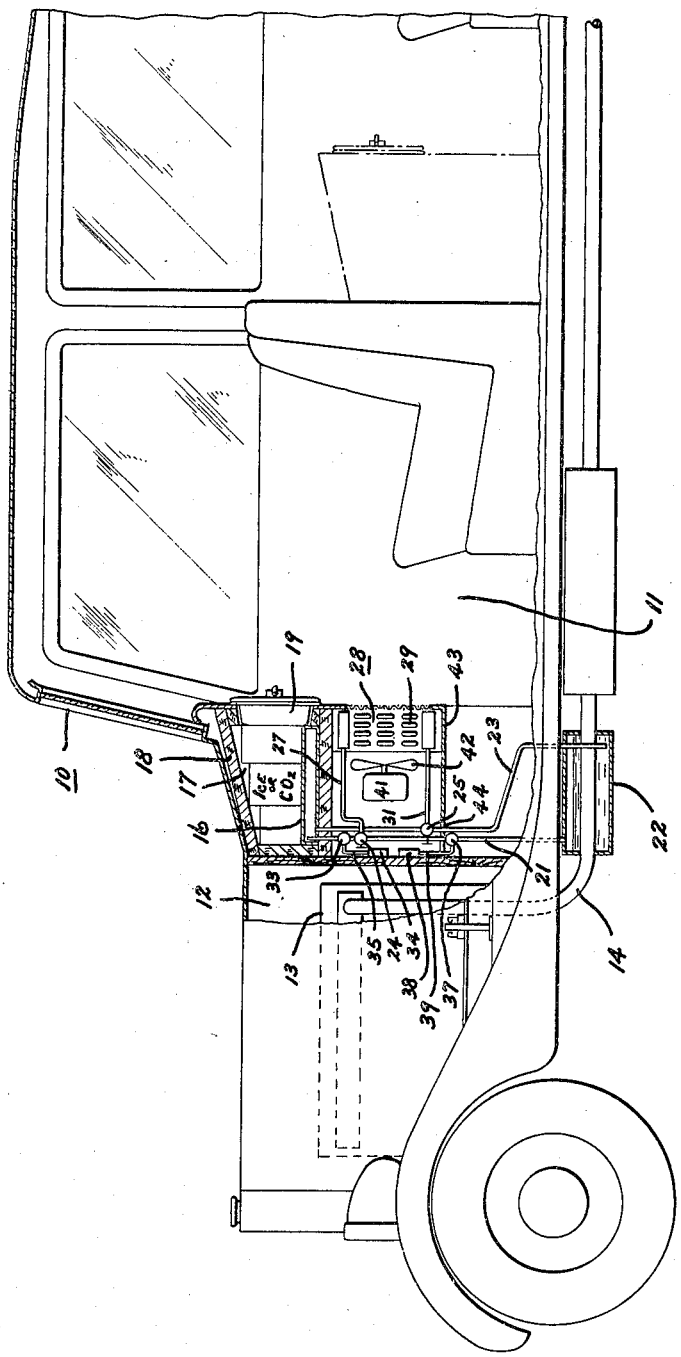

2,107,199

UNITED STATES PATENT OFFICE 2,107,199

HEATING AND COOLING SYSTEM

Richard S. Gaugler, Dayton, Ohio, assignor to General Motors Corporation, Dayton, Ohio, a corporation of Delaware Application February 20, 1935, Serial No. 7,401
Renewed April 9, 1937

10 Claims. (Cl. 257—7)

This invention relates to the conditioning of air for human comfort and relates particularly to refrigeration of air circulated through passenger vehicles in warm weather and the heating of the air in cold weather.

An object of the present invention is to provide a motor vehicle with a closed volatile refrigerant circulating system which may be rendered effective for cooling the interior of the passenger compartment of the vehicle during warm weather and which can be readily altered at will to cause heating of the compartment during cold weather.

A further object of the invention is to provide a system of the type described in the foregoing object wherein heat exchange between a plurality of heat transfer means included in the system will be prevented when the system is altered to produce a different condition in the compartment of the vehicle.

In carrying out the foregoing objects it is a still further object of the invention to provide a closed fluid heat transfer system for a motor driven vehicle which eliminates hazards due to the contents of the system becoming frozen and damaging or rendering the system inoperative.

Further objects and advantages of the present invention will be apparent from the following description, reference being had to the accompanying drawing, wherein a preferred form of the present invention is clearly shown.

In the drawing:

The figure illustrates a portion of a motor-driven vehicle having a closed fluid system constructed in accordance with my invention installed therein.

Referring to the drawing, for illustrating the present invention, I have shown these in a vehicle generally indicated by the reference character 10. The vehicle 10 includes a compartment 11 containing the usual seats and other accommodations for passengers and a motor compartment 12. The vehicle 10 is driven by a Diesel or any other form of an internal combustion engine 13 mounted in the compartment 12 and having suitable connections with wheels of the vehicle. The engine 13 includes an exhaust pipe 14 which carries exhaust gases from the combustion chambers of the engine to the rear of the vehicle 10. Exhaust gases from a high powered internal combustion engine, upon leaving the combustion chambers thereof, have a temperature in the neighborhood of 1000° F. and this heat has been used in various ways to heat the interior of a vehicle in which the engine is mounted.

For the purpose of carrying out the objects of my invention I mount a closed fluid circulating system at one side of the driver's seat within the passenger compartment 11 of the vehicle 10. The closed fluid system includes a relatively flat elongated tank 16 mounted in a compartment 17 which compartment is formed and surrounded by cork or any other suitable insulating material 18. Compartment 17 is provided with a door 19 which in the present illustration is accessible from the interior of compartment 11 for providing access to the compartment 17. A conduit 21 communicates with the upper portion of the interior of tank 16 and with the top portion of a closed tank 22 which surrounds the exhaust pipe 14 leading from the engine 13. Another conduit 23 has its lower end communicating with the bottom portion of tank 22 and has its upper end communicating with the bottom portion of tank 16. Each conduit 21 and 23 has manually actuated valves 24 and 25 respectively interposed therein between the two tanks 16 and 22. A conduit 27 communicates with pipe 21 and extends from valve 24 and is connected to the top portion of a unitary heat exchanger 28 comprising a plurality of finned loops or turns of pipe 29. Another conduit 31 communicates with pipe 23 and extends from valve 25 and is connected with the pipes 29 of the heat exchanger 28 at the lower portion thereof. A valve 33 interposed in conduit 21 between tank 16 and valve 24 is operated automatically in response to temperature changes by a thermostatic bulb 34 having a pipe connection 35 with the valve 33. Another automatically operated valve 37, having a thermostatic bulb 38 connected thereto by a pipe 39, is interposed in conduit 21 between the valve 24 and tank 22. The closed fluid system is adapted to contain any suitable volatile refrigerating medium. Helofluoro derivatives of the aliphatic hydrocarbons such as $CHCl_2F$, $CCl_2F_2$, $C_2Cl_2F_4$ and $CH_2ClF$ are specific examples of refrigerants suitable for use in my apparatus. These refrigerants are substantially odorless and completely non-toxic and in case the closed fluid system would be damaged in any manner to cause leakage of the refrigerating medium therefrom the refrigerant would not harm occupants of the vehicle. The tanks 16 and 22 of the system disclosed each obviously form or serve as heat transfer means after the system is charged with the volatile refrigerant.

I mount an electric motor 41 in any suitable and well-known manner on one side of the heat exchanger 28. A fan or blower 42 is carried upon the shaft of motor 41. Motor 41 may be operated at will by manually actuating a switch (not shown) having suitable electrical connections with the motor and with a storage battery (not shown) carried by the vehicle 10. Operation of motor 41 drives fan 42 to force air over and through the heat exchanger 28 into the passenger compartment 11 of the vehicle 10. A baffle 43 is positioned below the heat exchanger 28 and has an opening 44 therein. The baffle 43 and the opening 44 therein serves to direct air from the passenger compartment 11 to a point where the fan 42 can pick up the air and blow it through or over the heat exchanger. The baffle 43 also serves to catch drip water of condensation from the heat exchanger 28 and to direct this water to a drain when the heat exchanger is employed for cooling the air within the vehicle.

Having described the construction and the various elements of the closed fluid system I will now proceed to describe its function. Upon operating the vehicle 10 in cold weather or during winter months it is desired to heat the passenger compartment 11 of the vehicle 10. When this desirability is present the valve 24 in the closed fluid circulating system is manipulated or moved to a position to cause conduit 21 to communicate with conduit 27 and the valve 25 is also manipulated or moved to a position to cause conduit 23 to communicate with conduit 31. The valves 24 and 25 being of any suitable and well-known construction to prevent conduits 21 and 23 from communicating with the tank or chamber 16 at this time. The manipulation of the valves 24 and 25 as described is of course carried out prior to starting the combustion engine 13 and after having cooled the tank 22 by, for example, running or sprinkling cold water thereover to insure that substantially all of the refrigerant in the closed fluid system will be trapped in liquid form in the tank 22. Therefore after having put the refrigerant contained in tank 22 in communication with the heat exchanger 28 while at the same time shutting off communication of tank 22 with tank 16 the engine 13 may be started to operate the vehicle 10. During operation of the engine 13 or during travel of the vehicle 10 under the motive power of the engine the exhaust gases flowing through pipe 14 heat the liquid refrigerant in tank 22 and cause a portion of this refrigerant to evaporate or vaporize. The vaporized refrigerant flows through conduit 21, valve 37, valve 24 and conduit 27 to the upper portion of the heat exchanger 28. The heat exchanger 28 dissipates the heat of the refrigerant flowing therethrough to air within the vehicle 10 thus warming the interior of compartment 11 and causing condensation of the gaseous refrigerant, due to its being cooled by the air of the compartment. Refrigerant condensed in the conduits 29 of the heat exchanger 28 flows from the exchanger through conduit 31, valve 25 and conduit 23 back into the tank 22.

In order to augment heating of compartment 11 a switch as hereinbefore described as being interposed in an electrical circuit between the storage battery of the vehicle and motor 41 may be manipulated for causing operation of motor 41 to drive fan 42 which creates a forced circulation of air in compartment 11 and around baffle 43. The contents of the thermostatic bulb 38 being responsive to the temperature of air passing through the opening 44 in baffle 43 causes movement of valve 37 automatically to throttle the opening leading through the valve housing to control flow of refrigerant from tank 22 to the heat exchanger 28 to thereby govern the temperature of the heat exchanger. It will be seen therefore that the temperature of the heat exchanger 28 is prevented from becoming too hot while the system is functioning to heat the passenger compartment 11 of the vehicle 10.

Having described the function of the closed volatile refrigerant system for heating the compartment 11 of vehicle 10 I will now assume that it is desired to cool compartment 11, instead of heating the same, and I will therefore describe the alteration of the system necessary for producing cooling of the compartment. The tank 22 is cooled in any suitable manner such, for example, as by sprinkling or running cold water thereover, to cause flow of the volatile refrigerant from the heat exchanger 28 into tank 22 where it is condensed or liquefied. Valves 24 and 25 of the closed system are then manipulated, from the position described during production of heat by the system, to a position to cause the conduits 21 and 23 to communicate with tank or chamber 16 instead of communicating with the heat exchanger 28. The valves thus positioned cause refrigerant in tank 22 to be in communication with the interior of tank 16. Blocks of water ice or blocks of solid $CO_2$ are placed in the insulating compartment 17 and these blocks rest upon or are directly supported on the top wall of the relatively flat elongated tank 16. The refrigerating effect produced by the blocks of ice or $CO_2$ causes temperature and pressure differential between tank 16 and tank 22 and the refrigerant in tank 22 evaporates therefrom and flows through conduits 21 and 23 to tank 16. To augment the transfer of refrigerant from tank 22 to tank 16 the engine 13 may be operated and the exhaust gases flowing from the combustion chambers of the engine through exhaust pipe 14 heats the refrigerant in tank 22. This heating of the refrigerant in tank 22 causes same to evaporate or vaporize and flow through conduits 21 and 22 into tank 16 more rapidly. The engine 13 may be operated until all the refrigerant in tank 22 has vaporized and flows therefrom to tank 16 whereupon valve 24 is again manipulated into a position to cause communication of the interior of tank 16 with the heat exchanger 28 through conduit 27 and the upper portion of conduit 21. Simultaneously or substantially simultaneously with this operation of valve 24 valve 25 is also manipulated into a position to cause communication of the interior of tank 16 with the heat exchanger 28 through conduit 31 and the upper end of conduit 23. It is to be understood that the thermostatically operated valves 33 and 37 in no way interfere with the changing of the charge of refrigerant from tank 22 to tank 16 as described because the temperature in the vicinity of the thermostat bulbs 34 and 38 at the time the change-over is made permits the charge in the thermostatic system to maintain the valves open. If desired other means may be employed for maintaining the valves 33 and 37 in open position during the time the change-over described is being made.

After the foregoing described operations have been completed the closed fluid system may be made ready to produce cooling of the passenger compartment 11 of vehicle 10. The refrigerant having been transferred from tank 22 to tank 16, valve 24 is then manipulated into a position to open conduit 21, leading from the interior of tank 16, so that this conduit communicates with conduit 27 and consequently the coils or turns of conduit 29 of the heat exchanger 28. Valve 35 is also manipulated simultaneously or approximately simultaneously with manipulation of valve 24 as described to open conduit 23, leading from the interior of tank 16, so that this conduit communicates with conduit 31 and consequently the coils or turns of pipe 29 of the heat exchanger 28. In manipulating the valves 24 and 25 into the positions just described it will be understood that these valves trap all the refrigerant in the upper portion of the closed system and shut off communication between tank 16 and tank 22. The ice or solid $CO_2$ condenses or liquefies the volatile refrigerant in tank 16 and after the change-over previously described has been made this liquid refrigerant flows from tank 16 through conduit 23, valve 25 and pipe 31 into the lower turns or coils of pipe 29 in the heat exchanger 28. This liquid refrigerant absorbs heat from air in the vicinity of the exchanger 28 to cool the air and thus vaporizes the refrigerant and causes same to flow upwardly in the exchanger 28 to the pipe 27. The vaporized refrigerant flows from pipe 27 through valve 24 and pipe 21 to the top of the interior of tank 16 under control of the thermostatically operated valve 33. The location of the thermostat bulb 34 and the adjustment of valve 33 are such as to regulate the flow of refrigerant vaporized in the evaporator or exchanger 28 to tank 16 so as to prevent heat exchanger 28 from becoming too cold. In order to augment cooling of the interior of compartment 11 of vehicle 10 a manually actuated switch, interposed in the power line leading from motor 41 to the storage battery of the vehicle, is closed to cause operation of the motor 41 and consequently fan 42. The fan 42 sucks air upwardly through the opening 44 in baffle 43 and forces this air through or over the heat exchanger or evaporator 28 where it is cooled and circulated into or through the passenger compartment 11.

It is to be understood that the valves employed in the closed fluid system while being only diagrammatically shown may be of any conventional construction, well-known to those skilled in the art, and that additional valves may be employed in the system if necessary without departing from my invention. The valves are preferably of a type which will close off both the heat exchanger 28 and the tank 16 from the tank 22 when no cooling or heating of compartment 11 is required. In such case the tank 22 will be made large so as to permit evaporation and recondensation of the refrigerant in the tank during travel of the vehicle. It is also to be understood that suitable openings may be provided wherever desired such, for example, in baffle 43 or in the dash-board of the vehicle for obtaining access to the valves in the system.

It will be seen that I have provided an improved closed volatile fluid circulating system for a vehicle driven by an internal combustion engine which system is practical and efficient in operation and can be manufactured at low cost. My improved system employs a single heat exchanger and the system can be readily modified at will to permit the single exchanger to serve as a heating element or cooling element. The system disclosed is capable of use either during cold weather or during warm weather. The closed fluid system of my invention is independent of the cooling fluid circuit for the internal combustion engine of the vehicle and contains a volatile refrigerating fluid thus eliminating all hazards relative to freezing of the fluid in the system and rendering the system inoperative. My system may be installed in a vehicle at any desired locality within the passenger compartment. The elements of the system may, if desired, be positioned at the rear of the front seat as shown in the dot-dash lines in the drawing.

While the form of embodiment of the invention as herein disclosed, constitutes a preferred form, it is to be understood that other forms might be adopted, all coming within the scope of the claims which follow.

What is claimed is as follows:

1. In combination with a vehicle driven by an internal combustion engine and having a compartment to be cooled or heated, a heat exchanger thermally associated with the vehicle compartment, said heat exchanger forming a portion of a closed system containing a fluid to be circulated therein, said closed system including in addition to said heat exchanger a plurality of heat transfer means, means for cooling one of said heat transfer means to cause said heat exchanger to produce a cooling effect in the vehicle compartment, another of said heat transfer means being in intimate thermal association with a heat generating part of the engine of the vehicle and heated thereby to cause said heat exchanger to produce a heating effect in the vehicle compartment, means operable to put one of said heat transfer means in communication with said heat exchanger and to prevent communication between said heat exchanger and another of said plurality of heat transfer means, and temperature responsive means for controlling the flow of fluid in said system between one of said heat transfer means and said heat exchanger to regulate the rate of heat transfer therebetween.

2. In combination with a vehicle driven by an internal combustion engine and having a compartment to be cooled or heated, a heat exchanger thermally associated with the vehicle compartment, said heat exchanger forming a portion of a closed system containing a fluid to be circulated therein, said closed system including in addition to said heat exchanger a plurality of heat transfer means, means for cooling one of said heat transfer means to cause said heat exchanger to produce a cooling effect in the vehicle compartment, another of said heat transfer means being in intimate thermal association with a heat generating part of the engine of the vehicle and heated thereby to cause said heat exchanger to produce a heating effect in the vehicle compartment, means operable to put one of said heat transfer means in communication with said heat exchanger and to prevent communication between said heat exchanger and another of said plurality of heat transfer means, temperature responsive means for controlling the flow of fluid in said system between said one of said heat transfer means and said heat exchanger to regulate the rate of heat transfer therebetween, and a second temperature responsive means adapted to control the flow of fluid in said system between said another of said plurality of heat transfer means and said heat exchanger to regulate the rate of heat transfer therebetween when said another of said plurality of the heat transfer means is put into fluid communication with said heat exchanger and the fluid communication between said one of said heat transfer means and said heat exchanger is closed off by said operable means.

3. In combination with a vehicle driven by an internal combustion engine and having a compartment to be cooled or heated, a heat exchanger thermally associated with the vehicle compartment, said heat exchanger forming a portion of a closed system containing a volatile fluid to be circulated therein, said closed system including in addition to said heat exchanger two separate heat transfer elements, means for cooling one of said heat transfer elements to cause said heat exchanger to produce a refrigerating effect in the vehicle compartment, the other of said heat transfer elements being in intimate thermal association with the exhaust pipe of the engine of the vehicle and heated by exhaust gases therefrom to cause said heat exchanger to produce a heating effect in the vehicle compartment, means operable at will to put one of said heat transfer elements in communication with said heat exchanger and to prevent communication between said heat exchanger and the other of said heat transfer elements, and temperature responsive means for controlling the flow of fluid in said system between said one of said heat transfer elements and said heat exchanger to regulate the rate of heat transfer therebetween.

4. In combination with a vehicle driven by an internal combustion engine and having a compartment to be cooled or heated, a heat exchanger thermally associated with the vehicle compartment, said heat exchanger forming a portion of a closed system containing a volatile fluid to be circulated therein, said closed system including in addition to said heat exchanger two separate heat transfer elements, means for cooling one of said heat transfer elements to cause said heat exchanger to produce a refrigerating effect in the vehicle compartment, the other of said heat transfer elements being in intimate thermal association with the exhaust pipe of the engine of the vehicle and heated by exhaust gases therefrom to cause said heat exchanger to produce a heating effect in the vehicle compartment, means operable at will to put one of said heat transfer elements in communication with said heat exchanger and to prevent communication between said heat exchanger and the other of said heat transfer elements, temperature responsive means for controlling the flow of fluid in said system between said one of said heat transfer elements and said heat exchanger to regulate the rate of heat transfer therebetween, and a second temperature responsive means adapted to control the flow of fluid in said system between said other of said heat transfer elements and said heat exchanger to regulate the rate of heat transfer therebetween when said other of said heat transfer elements is put into fluid communication with said heat exchanger and the fluid communication between said one of said heat transfer elements and said heat exchanger is closed off by said operable means.

5. In combination with a vehicle driven by an internal combustion engine and having a compartment to be cooled or heated, a heat exchanger thermally associated with the vehicle compartment, said heat exchanger forming a portion of a closed system containing a fluid to be circulated therein, said closed system including in addition to said heat exchanger a plurality of heat transfer means, means for cooling one of said heat transfer means to cause said heat exchanger to produce a cooling effect in the vehicle compartment, another of said heat transfer means being in intimate thermal association with a heat generating part of the engine of the vehicle and heated thereby to cause said heat exchanger to produce a heating effect in the vehicle compartment, means operable to put one of said heat transfer means in communication with said heat exchanger and to prevent communication between said heat exchanger and another of said plurality of heat transfer means, and means for controlling the flow of fluid in said system between said one of said heat transfer means and said heat exchanger to regulate the rate of heat transfer therebetween.

6. In combination with a vehicle driven by an internal combustion engine and having a compartment to be cooled or heated, a heat exchanger thermally associated with the vehicle compartment, said heat exchanger forming a portion of a closed system containing a fluid to be circulated therein, said closed system including in addition to said heat exchanger a plurality of heat transfer means, means for cooling one of said heat transfer means to cause said heat exchanger to produce a cooling effect in the vehicle compartment, another of said heat transfer means being in intimate thermal association with a heat generating part of the engine of the vehicle and heated thereby to cause said heat exchanger to produce a heating effect in the vehicle compartment, means operable to put one of said heat transfer means in communication with said heat exchanger and to prevent communication between said heat exchanger and another of said plurality of heat transfer means, means for controlling the flow of fluid in said system between said one of said heat transfer means and said heat exchanger to regulate the rate of heat transfer therebetween, and a second means for controlling the flow of fluid in said system between said another of said plurality of heat transfer means and said heat exchanger to regulate the rate of heat transfer therebetween when said another of said plurality of the heat transfer means is put into fluid communication with said heat exchanger and the fluid communication between said one of said heat transfer means and said heat exchanger is closed off by said operable means.

7. In combination, a compartment to be cooled or heated, a heat exchanger for said compartment, said heat exchanger forming a portion of a closed system containing a fluid volatile at atmospheric temperature and pressure to be circulated therein, said closed system also including a heat transfer means disposed above said heat exchanger and a second heat transfer means disposed below said heat exchanger, means for cooling said first named heat transfer means to cause the volatile fluid to condense therein, means for conveying the condensed fluid from said first named heat transfer means to said heat exchanger wherein it vaporizes and causes cooling of said compartment, means for heating said second named heat transfer means to cause said fluid to vaporize therein, means for conveying the vaporized fluid from said second named heat transfer means to said heat exchanger to cause heating of said compartment, and means operable to put one of said heat transfer means in communication with said heat exchanger and to prevent communication between said heat exchanger and the other of said heat transfer means.

8. In combination, a compartment to be cooled or heated, a heat exchanger for said compartment, said heat exchanger forming a portion of a closed system containing a fluid volatile at atmospheric temperature and pressure to be circulated therein, said closed system including a heat transfer means disposed above said heat exchanger and a second heat transfer means disposed below said heat exchanger, means for cooling said first named heat transfer means to cause the volatile fluid to condense therein, means for conveying the condensed fluid from said first named heat transfer means to said heat exchanger wherein it vaporizes and causes cooling of said compartment, means for heating said second named heat transfer means to cause said fluid to vaporize therein, means for conveying the vaporized fluid from said second named heat transfer means to said heat exchanger to cause heating of said compartment, means operable to put one of said heat transfer means in communication with said heat exchanger and to prevent communication between said heat exchanger and the other of said heat transfer means, and means responsive to the temperature within said compartment for controlling the flow of fluid in said system between one of said heat transfer means and said heat exchanger to regulate the rate of heat transfer therebetween.

9. In combination with a vehicle having means for driving same and having a compartment to be cooled or heated, a heat exchanger for said compartment, said heat exchanger forming a portion of a closed system containing a fluid volatile at atmospheric temperature and pressure to be circulated therein, said closed system including a heat transfer means disposed above said heat exchanger and a second heat transfer means disposed below said heat exchanger, means for cooling said first named heat transfer means to cause the volatile fluid to condense therein, means for conveying the condensed fluid from said first named heat transfer means to said heat exchanger wherein it vaporizes and causes cooling of said compartment, said second named heat transfer means being in intimate thermal association with a heat dissipating part of the means for driving the vehicle and heated thereby to cause said fluid to vaporize therein, means for conveying the vaporized fluid from said second named heat transfer means to said heat exchanger to cause heating of said compartment, and means operable to put one of said heat transfer means in communication with said heat exchanger and to prevent communication between said heat exchanger and the other of said heat transfer means.

10. In combination with a vehicle having means for driving same and having a compartment to be cooled or heated, a heat exchanger for said compartment, said heat exchanger forming a portion of a closed system containing a fluid volatile at atmospheric temperature and pressure to be circulated therein, said closed system including a heat transfer means disposed above said heat exchanger and a second heat transfer means disposed below said heat exchanger, means for cooling said first named heat transfer means to cause the volatile fluid to condense therein, means for conveying the condensed fluid from said first named heat transfer means to said heat exchanger wherein it vaporizes and causes cooling of said compartment, said second named heat transfer means being in intimate thermal association with a heat dissipating part of the means for driving the vehicle and heated thereby to cause said fluid to vaporize therein, means for conveying the vaporized fluid from said second named heat transfer means to said heat exchanger to cause heating of said compartment, means operable to put one of said heat transfer means in communication with said heat exchanger and to prevent communication between said heat exchanger and the other of said heat transfer means, and means responsive to the temperature within said compartment for controlling the flow of fluid in said system between one of said heat transfer means and said heat exchanger to regulate the rate of heat transfer therebetween.

RICHARD S. GAUGLER.